Aug. 5, 1930.  J. E. DE LONG  1,772,341

AUTOMOBILE HEATING SYSTEM

Filed Aug. 24, 1925

Inventor,
James E. De Long
By Brown, Boettcher & Dienner,
Attys.

Patented Aug. 5, 1930

1,772,341

UNITED STATES PATENT OFFICE

JAMES E. DE LONG, OF WAUKESHA, WISCONSIN, ASSIGNOR TO WAUKESHA MOTOR COMPANY, OF WAUKESHA, WISCONSIN, A CORPORATION OF WISCONSIN

AUTOMOBILE HEATING SYSTEM

Application filed August 24, 1925. Serial No. 51,903.

My invention relates to heating systems, particularly to an improved system for efficiently utilizing the heat of the engine cooling fluid for heating the interior of an automotive vehicle. In accordance with my invention, I utilize the steam generated in the engine water jacket and by means of a simple valve mechanism controlled by the driver I cause this steam to either flow in the ordinary manner through the engine radiator to be condensed, or to flow first through a heating radiator within the car body, such radiator giving off radiant heat to the car body and acting also as a condenser to co-operate with the engine radiator to efficiently condense the steam back into water.

My improved arrangement is disclosed on the drawings, in which.

Figure 1:
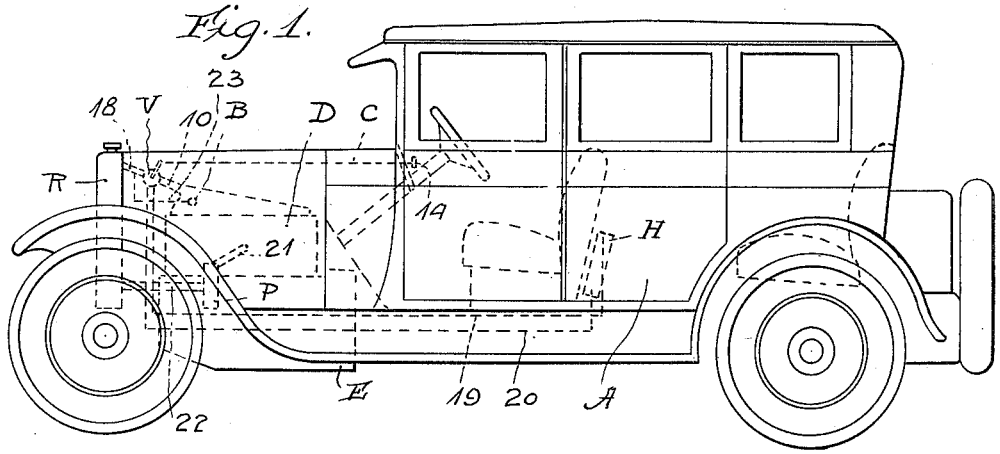
Figure 1 shows an automobile in which my system is applied.

The engine E has the usual water jacket D which at its upper end has the outlet 10. The circulating pump P has its outlet end connected with the water jacket and its inlet end connected with the outlet of the engine radiator R. H represents a heater which may be in the form of a sectional radiator and it is placed in some convenient position within the automobile A, as for example, back of the front seat as shown. V represents a controlling valve having the cylindrical housing 11 and the valve plug 12, which plug has a lever 13 connected by a rod C with an operating button or knob 14 within the automobile in position to be operated by the driver. The valve plug shown has the diametral port 15 and the diametrically opposite chordal ports 16 and 17. The water jacket outlet 10 communicates with the valve and at a diametrically opposite point the pipe 18 leads from the valve to the engine radiator R. At intermediate points and at opposite sides the pipes 19 and 20 connect with the valve structure. The pipe 19 leads to the upper end of the automobile heater H, while the pipe 20 extends to the lower end of the heater. The pipes 21 and 22 connect the pump P, respectively, with the water jacket and with the lower end of the radiator.

Figure 3:
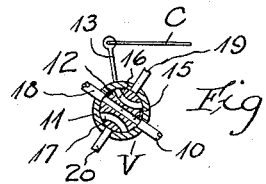
Fig. 3 is a sectional view of the controlling valve, showing normal position thereof.
Figure 2:
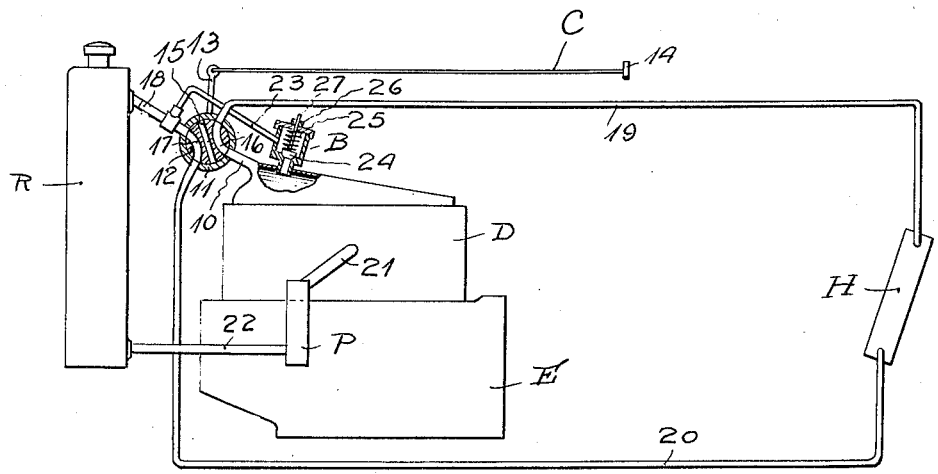
Fig. 2 is a more or less diagrammatic view showing the circulatory system and the control thereof.

In accordance with my invention I preferably permit the fluid in the water jacket to be sufficiently heated to boil and to form steam. In the normal position of the valve structure V, as shown in Fig. 3, the automobile heater H is disconnected from service and the diametral port 15 connects the water jacket outlet 10 directly with the radiator R, the steam or hot water then flowing from the water jacket into the radiator where the steam is condensed and the water cooled and the cool water returns to the water jacket through the pipe 22, pump P, and outlet 21. If it is desired to heat the interior of the automobile the driver by manipulating the knob 14 pulls the rod C to swing the valve lever 13 to position the valve plug so that the direct passage 15 will be closed, and so that the port 16 will connect the water jacket outlet 10 with the pipe 19, and the port 17 will connect the return pipe 20 with the pipe 18 leading to the radiator R. The flow will then be from the water jacket through port 16, pipe 19, heater H, return pipe 20, port 17, pipe 18, radiator R, pipe 22, pump P, and pipe 21, back to the water jacket. The steam flowing through the heater H will give up its heat to heat the vehicle, and if it is fully condensed the water of condensation will flow through the pipe 20 to and through the radiator R, and return with the other water to the water jacket by the pump P. If the steam is not all condensed in the heater H, it will find its way back to the radiator R which will complete the condensation. Thus instead of wasting the heat by dissipating it by the air flow through the radiator R, it is efficiently utilized to heat the interior of the automobile.

I preferably provide a relief valve B between the water chamber D and the engine radiator R, so that any excess supply of steam can flow directly to the radiator. As shown, I have mounted the valve on the water jacket D and have connected its outlet by the pipe 23 with the pipe 18 leading to the radiator R. The valve may be manually controlled or it may operate automatically. As shown, the valve disc 24 is held by a spring 25 against its seat and it is preferably made adjustable as by means of the nut 26 on its stem 27, so that it can be set to respond automatically when the steam pressure reaches a certain limit, the steam then raising the valve and flowing directly to the radiator R, thus relieving the flow through the heater H.

My improved system can be used with any type of steam cooling, regardless of whether the steam enters the engine radiator at the top or at the bottom. Other modifications in the arrangement could also be made without departing from the spirit of the invention. My improved system permits the ready and efficient use of the heat which was heretofore dissipated by the air flow through the radiator passageway. Instead of blowing this heated air back around the engine, the heat is utilized to greater advantage at the inside of the vehicle.

I claim:

1. In combination, an internal combustion engine, a water jacket therefore, an outlet pipe extending from the water jacket, a radiator, an inlet pipe therefor, a condenser, an inlet pipe extending to the condenser, an outlet pipe extending from the condenser, and a single means for connecting the condenser inlet pipe and outlet pipe to the outlet pipe of the water jacket and the inlet pipe of the radiator, respectively, or for disconnecting the condenser pipes from the water jacket and the radiator and connecting the outlet pipe of the water jacket directly to the inlet pipe of the radiator, optionally.

2. In combination, an internal combustion engine, a water jacket therefor, a radiator, a condenser, and a single means for connecting the condenser in series with the radiator and the water jacket or for disconnecting it from the water jacket and connecting the outlet of the water jacket directly to the inlet of the radiator, optionally.

3. In combination, an internal combustion engine, a water jacket therefor, a radiator, a condenser, inlet and outlet pipes extending to and from the condenser, a radiator, an inlet pipe extending from the radiator, an outlet pipe extending from the water jacket, and a single valve means interposed between all of said pipes for connecting the condenser pipes to the water jacket outlet pipe or for disconnecting the water jacket outlet pipe from the condenser pipes and connecting it to the radiator inlet pipe, optionally.

4. In combination, an internal combustion engine, a water jacket therefor, a radiator, a condenser, a valve casing, inlet and outlet pipes connected to the casing and extending to and from the condenser, an inlet pipe extending from the radiator and connected to the valve casing, an outlet pipe extending from the water jacket and connected to said casing, and a valve mounted in the valve casing and adapted when in one position to connect the inlet and outlet pipes of the condenser to the water jacket outlet pipe and the radiator inlet pipe, respectively, said valve being adapted when in another position to connect the radiator inlet pipe to the water jacket outlet pipe and cut off communication between the condenser pipes and the radiator and water jacket pipes.

5. In combination, an internal combustion engine, a water jacket therefor, a radiator, a condenser, and a single valve means for connecting the condenser in series with the outlet of the water jacket and the inlet of the radiator or for cutting off communication between the condenser and the water jacket and connecting the outlet of the water jacket to the inlet of the radiator, optionally.

In witness whereof, I hereunto subscribe my name this 25th day of Aug., 1925.

JAMES E. DE LONG.